US006473180B2

United States Patent
Hirosawa

(10) Patent No.: US 6,473,180 B2
(45) Date of Patent: Oct. 29, 2002

(54) MEASURING METHOD OF LIQUID CRYSTAL PRETILT ANGLE AND MEASURING EQUIPMENT OF LIQUID CRYSTAL PRETILT ANGLE

(75) Inventor: Ichiro Hirosawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/940,524

(22) Filed: Aug. 29, 2001

(65) Prior Publication Data

US 2002/0024667 A1 Feb. 28, 2002

Related U.S. Application Data

(62) Division of application No. 09/201,824, filed on Dec. 1, 1998, now Pat. No. 6,317,208.

(30) Foreign Application Priority Data

Dec. 2, 1997 (JP) ............................................. 9-331715

(51) Int. Cl.[7] .................................................. G01J 4/00
(52) U.S. Cl. ....................................................... 356/364
(58) Field of Search ................................ 356/364–367, 356/445, 369; 359/93–94; 250/225; 349/117–119, 123–126, 133, 138, 25, 34, 18; 252/299.63, 299.65

(56) References Cited

U.S. PATENT DOCUMENTS 5,381,253 A * 1/1995 Sharp et al. ................... 349/18

5,903,352 A 5/1999 Ohsaki et al.

FOREIGN PATENT DOCUMENTS

| JP | 5-18860 | 1/1993 |
|----|---------|--------|
| JP | 5-40263 | 2/1993 |
| JP | 6-82239 | 3/1994 |
| JP | 6-194659 | 7/1994 |
| JP | 7-13114 | 1/1995 |
| JP | 8-94445 | 4/1996 |
| JP | 9-5040 | 1/1997 |
| JP | 9-96815 | 4/1997 |

OTHER PUBLICATIONS

"Accurate Determination of Liquid–Crystal Tilt Bias Angles", Journal of Applied Physics, vol. 48, pp. 1783–1792, 1977 by Scheffer and J. Nehring.

"Determination of Molecular Inclination in Rubbed Polymer for Liquid Crystal Alignment by Measuring Retardation", Japanese Journal of Applied Physics, vol. 32, pp. L1242–L1244, 1993 by K.–Y. Han et al.

* cited by examiner

Primary Examiner—Frank G. Font
Assistant Examiner—Tu T Nguyen
(74) Attorney, Agent, or Firm—Sughrue Mion, PLLC

(57) ABSTRACT

By setting the linearly polarized light with normal incidence on the liquid crystal sample 3 and rotating the liquid crystal sample 3 on a rotation stage 7 within plane, the dependencies of the amplitude ratio as well as the optical retardation of the transmitted light on the azimuth of the liquid crystal sample, with respect to the polarization direction of the incident light, are measured. From these measured results, a liquid crystal pretilt angle is determined.

4 Claims, 9 Drawing Sheets

Azimuthal direction of the sample (deg)

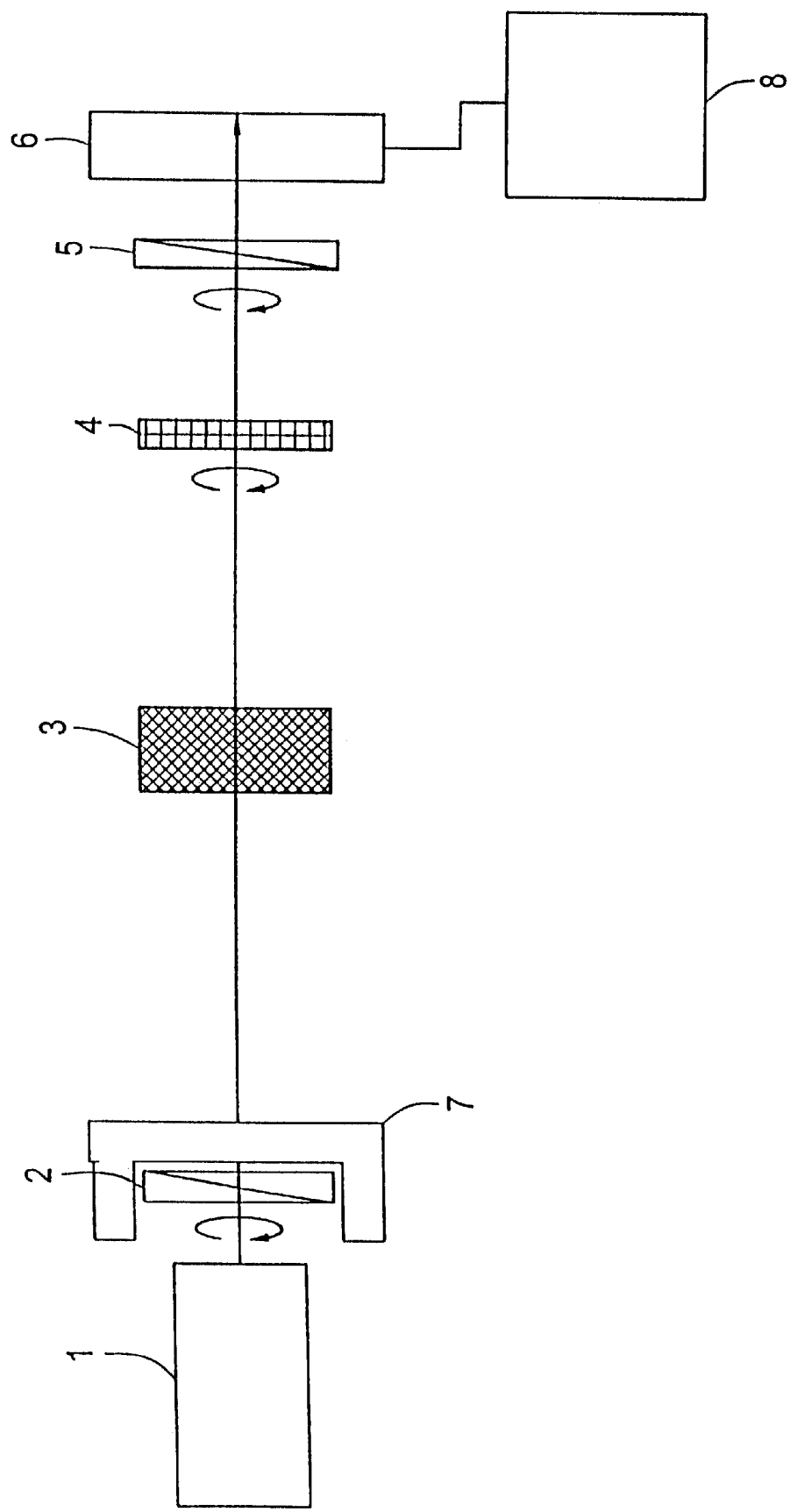

MEASURING METHOD OF LIQUID CRYSTAL PRETILT ANGLE AND MEASURING EQUIPMENT OF LIQUID CRYSTAL PRETILT ANGLE

BACKGROUND OF THE INVENTION

This is a divisional of application Ser. No. 09/201,824, now U.S. Pat. No. 6,317,208, filed on Dec. 1, 1998, the disclosure of which is incorporated herein by reference.

1. Field of the Invention

The present invention relates to an estimation method for a film having the optical anisotropy due to the alignment of molecules, for example, a liquid crystal alignment layer and the like which provides the initial orientation to the liquid crystal molecules in a liquid crystal display device.

2. Description of the Related Art

The crystal rotation method (described by T. J. Scheffer and J. Nehring in Journal of Applied Physics, Vol. 48, pp. 1783, 1977) has been widely employed as an optical method of measuring an angle that liquid crystal molecules in an antiparallel cell make with the reverse of a substrate. In this method, with the linearly polarized light incident on the sample, the optical retardation (phase shift) of the transmitted light which is generated through birefringence is measured as a function of the incident angle. On the other hand, instead of the direct measurement of the dependence of the polarization in the transmitted light on the incident direction, another measuring method in which an analyzer is placed behind a sample and the quantity of light transmitted through the analyzer is monitored as a function of the incident angle is also widely utilized.

However, the above-mentioned conventional techniques have the following problems as pointed out, for example, by K.-Y. Han et al. in Japanese Journal of Applied Physics, Vol. 32, pp. L1242–1244, L277–279 1993.

That is, because the liquid crystal is held between a pair of glass substrates, the refraction at the substrate causes a shift in the incident position of the light on the liquid crystal section, as the incident angle is changed. As the place through which the light passes within the liquid crystal is varied, the polarization of the transmitted light directly reflects the variance in thickness of the liquid crystal layer with the place, which hinders the accurate measurements. The incident angle of the light on the sample is usually changed by rotating the sample, and thus the relative position between the incident light and the transmitted light also changes, accompanying with the sample rotation. As a result, in order to carry out an accurate polarization measurement of the transmitted light, it is necessary for the positions of an analyzer and the like to be adjusted according to the thickness, the material and the rotation angle of the sample and the measuring efficiency of this method becomes low.

SUMMARY OF THE INVENTION

In light of the above problems, an object of the present invention is to provide a method of measuring a liquid crystal pretilt angle which determines a liquid crystal pretilt angle by setting the linearly polarized light incident on a liquid crystal sample and measuring the polarization of the transmitted light thereof; wherein:

said linearly polarized light is normal to the surface of the liquid crystal sample in incidence; and by rotating said liquid crystal sample within plane, the dependencies of the amplitude ratio of said transmitted light as well as the optical retardation of said transmitted light on the azimuth of the liquid crystal sample with respect to the polarization direction of the incident light are measured and thereby the pretilt angle of said liquid crystal sample is determined.

Another object of the present invention is to provide a method of measuring a liquid crystal pretilt angle which determines a liquid crystal pretilt angle by setting the linearly polarized light incident on a liquid crystal sample and measuring the polarization of the transmitted light thereof; wherein:

having passed through a polarizer, said linearly polarized light is normal to the surface of the liquid crystal sample in incidence; and by rotating said polarizer within plane, the dependencies of the amplitude ratio of said transmitted light as well as the optical retardation of said transmitted light on the azimuth of the liquid crystal sample with respect to the polarization direction of the incident light are measured and thereby the pretilt angle of said liquid crystal sample is determined.

Another object of the present invention is to provide a method of measuring a liquid crystal pretilt angle which determines a liquid crystal pretilt angle by setting the linearly polarized light incident on a liquid crystal sample and measuring the polarization of the transmitted light thereof; wherein:

having passed through a polarizer and a ½-wave plate, said linearly polarized light is normal to the surface of the liquid crystal sample in incidence; and by rotating said ½-wave plate within plane, the dependencies of the amplitude ratio of said transmitted light as well as the optical retardation of said transmitted light on the azimuth of the liquid crystal sample with respect to the polarization direction of the incident light are measured and thereby the pretilt angle of said liquid crystal sample is determined.

Another object of the present invention is to provide an equipment of measuring a liquid crystal pretilt angle; comprising:

a light source;

a polarizer which polarizes the emitted light from said light source;

a holder which holds a liquid crystal sample as an object of the measurement;

a mechanism to rotate said holder within plane;

a means for measuring, with the light having passed through said liquid crystal sample, the amplitude ratio of said transmitted light as well as the optical retardation of said transmitted light; and a means for determining a liquid crystal pretilt angle from said measured polarization.

Another object of the present invention is to provide an equipment of measuring a liquid crystal pretilt angle; comprising:

a light source;

a polarizer which polarizes the emitted light from said light source;

a mechanism to rotate said polarizer within plane;

a holder which is placed behind said polarizer and holds a liquid crystal sample as an object of the measurement;

a means for measuring, with the light having passed through said liquid crystal sample, the amplitude ratio of said transmitted light as well as the optical retardation of said transmitted light; and a means for determining a liquid crystal pretilt angle from said measured polarization.

Another object of the present invention is to provide an equipment of measuring a liquid crystal pretilt angle; comprising:
- a light source;
- a polarizer which polarizes the emitted light from said light source;
- a ½-wave plate placed behind the polarizer;
- a mechanism to rotate said ½-wave plate within plane;
- a holder which is placed behind said ½-wave plate and holds a liquid crystal sample as an object of the measurement;
- a means for measuring, with the light having passed through said liquid crystal sample, the amplitude ratio of said transmitted light as well as the optical retardation of said transmitted light; and
- a means for determining a liquid crystal pretilt angle from said measured polarization.

In the method measuring a liquid crystal pretilt angle according to the present invention, the incident angle of the light with respect to the sample surface is constant and the optical path within the liquid crystal layer does not change during the measurement. Therefore, a deterioration in accuracy, resulting from non-uniformity of the liquid crystal layer thickness, which is a problem for the conventional methods, does not occur. Furthermore, in measuring the polarization of the transmitted light, unlike in the conventional methods, no adjustment of the detector position is required to accompany the rotation of the liquid crystal sample. The measurement can be made, while the detector is kept in a fixed position, which enables a rapid measurement. The polarization of the transmitted light may be calculated in terms of 4×4 matrices with anisotropic dielectric constants $\in$ e and $\in$ o, the pretilt angle θ and the liquid crystal layer thickness d. Values of the pretilt angle θ and the liquid crystal layer thickness d may be determined, then, through the optimization to fit the dependencies of the polarization of the transmitted light on either azimuthal direction of the sample or that of the polarized light which are obtained from the actual measurements.

Further, an equipment of measuring a liquid crystal pretilt angle according to the present invention has such an arrangement as described above that can carry out the above-mentioned method of measuring a liquid crystal pretilt angle favourably.

As described above, in the present invention, the incident angle of the light with respect to the sample surface is constant and the optical path within the liquid crystal layer does not change during the measurement. Therefore, a deterioration in accuracy, resulting from non-uniformity of the liquid crystal layer thickness, which is a problem for the conventional methods, does not occur. Furthermore, in measuring the polarization of the transmitted light, unlike in the conventional methods, no adjustment of the detector position is required to accompany the rotation of the liquid crystal sample. The measurement can be made, while the detector is kept in a fixed position, which enables a rapid measurement.

BRIEF DESCRIPTION OF THE DRAWINGS

FIG. 9 is a schematic diagram illustrating another example of an equipment of measuring a liquid crystal pretilt angle in accordance with the present invention.

DETAILED DESCRIPTION OF THE PREFERRED EMBODIMENTS

In a method of measuring a liquid crystal pretilt angle according to the present invention, a liquid crystal sample, or a polarizer or a ½-wave plate disposed in front of the liquid crystal sample is rotated within plane and the polarization of the transmitted light, namely the amplitude ratio and the optical retardation of the transmitted light, is measured as a function of the azimuth of the liquid crystal sample, with respect to the polarization direction of the incident light, and thereby a liquid crystal pretilt angle is determined.

Further, the dependence of the polarization of the transmitted light, namely the amplitude ratio and the optical retardation of the transmitted light, on the azimuth of the liquid crystal sample may be measured by rotating, for example, a ¼-wave plate or an analyzer placed behind the liquid crystal sample, within plane.

EXAMPLE 1

Now, showing the examples, the present invention is further described in detail.

Figure 1:
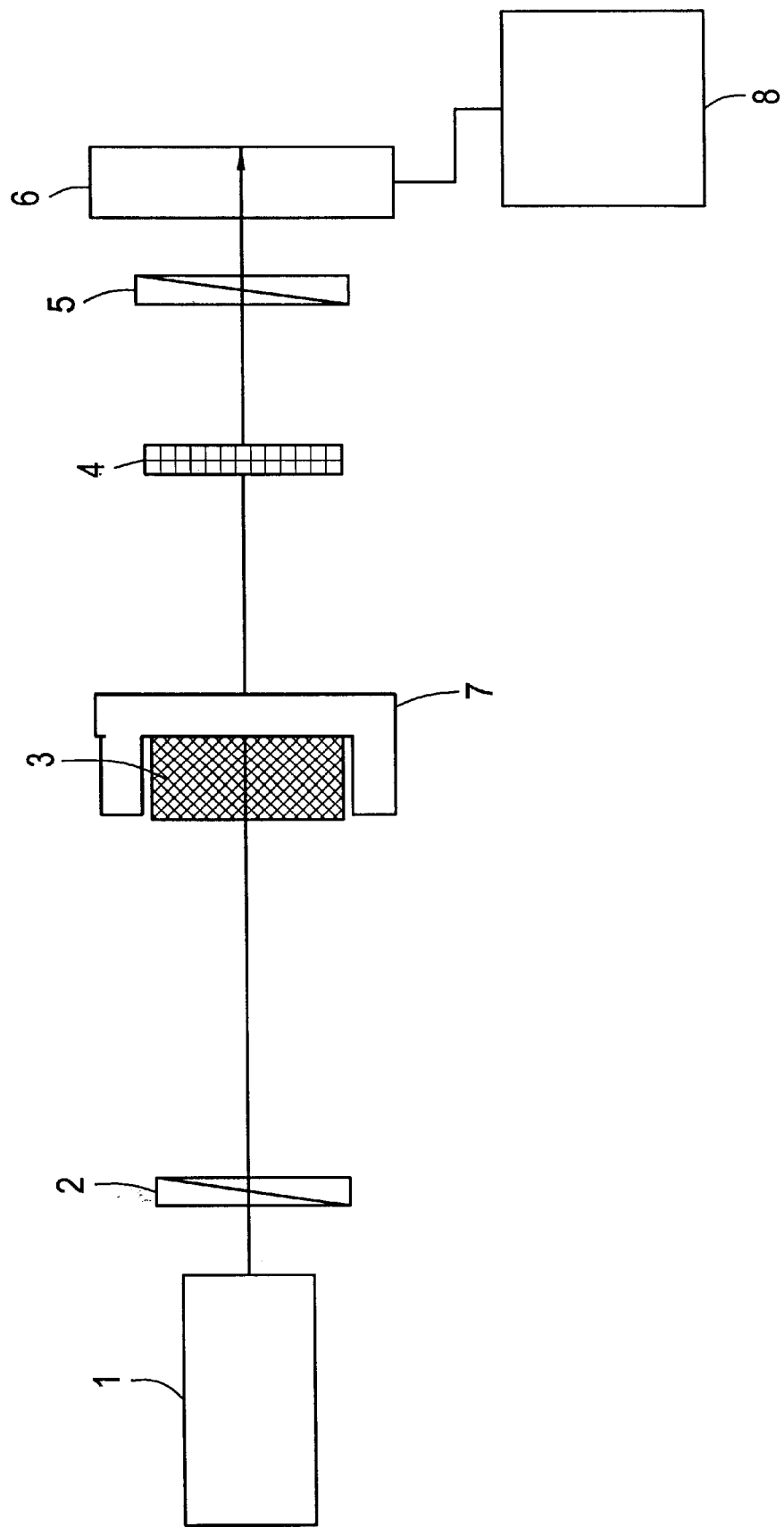
FIG. 1 is a schematic diagram illustrating an example of an equipment of measuring a liquid crystal pretilt angle in accordance with the present invention.

Firstly, referring to FIG. 1, the first embodiment of the present invention is described. FIG. 1 is a schematic diagram illustrating an arrangement of an equipment of measuring a liquid crystal pretilt angle wherein the linearly polarized light is normal to the surface of the liquid crystal sample in incidence and, by rotating said liquid crystal sample within plane, the dependencies of the amplitude ratio of said transmitted light as well as the optical retardation of said transmitted light on the azimuth of the liquid crystal sample with respect to the polarization direction of the incident light are measured, and thereby the pretilt angle of said liquid crystal sample is determined. The light emitted from a light source 1 passes through a polarizer 2 and, being linearly polarized, travels on a sample 3 with normal incidence. 'Normal' therein indicates that the optical axis of the incident light is perpendicular to the surface of the liquid crystal sample. As a light source, a 1 mW He—Ne laser is utilized. A rotation stage 7 holds the liquid crystal sample 3 and besides has a mechanism to rotate the liquid crystal sample 3 within plane. A rotation within plane refers to a rotation the axis of which corresponds to the optical axis.

The light transmitted through the sample passes through a ¼-wave plate 4 and an analyzer 5, and then goes into a detector 6. This detector monitors the polarization of the transmitted light and, from the obtained data, a liquid crystal pretilt angle is calculated by a data analysis unit 8. The orientation of the polarizer and that of the analyzer are set parallel. The polarization of the transmitted light is determined by a method in which the ¼-wave plate 4 is rotated within plane and the dependence of the output intensity of the transmitted light on the azimuth of the ¼-wave plate (referred as the phase rotation method, hereinafter). The polarization is measured by sampling the output intensity every 3 degree of azimuth of the phaser. The azimuthal direction of the sample and the polarization direction of the transmitted light are controlled by the rotation of the liquid crystal sample within plane.

With this set-up, a liquid crystal sample was measured as follows. Glass substrates 7059 from Corning Inc., with a thickness of 1.1 mm, were spin-coated with an alignment material PI-A produced by Nissan Chemical Industries Ltd.. After baked at 250° C. for 1 hour, the surface was rubbed with the rayon cloth. A cell was then assembled by sticking a pair of glass substrates together with adhesive in such a way that the rubbing directions thereof were opposite to each other. In this, the adhesive mixed with a 4 μm spacer was utilized (Sample A). This cell was filled, through a capillary action, with the nematic liquid crystal produced by Merck Ltd., under the trade name of ZNI-2293.

Figure 2:
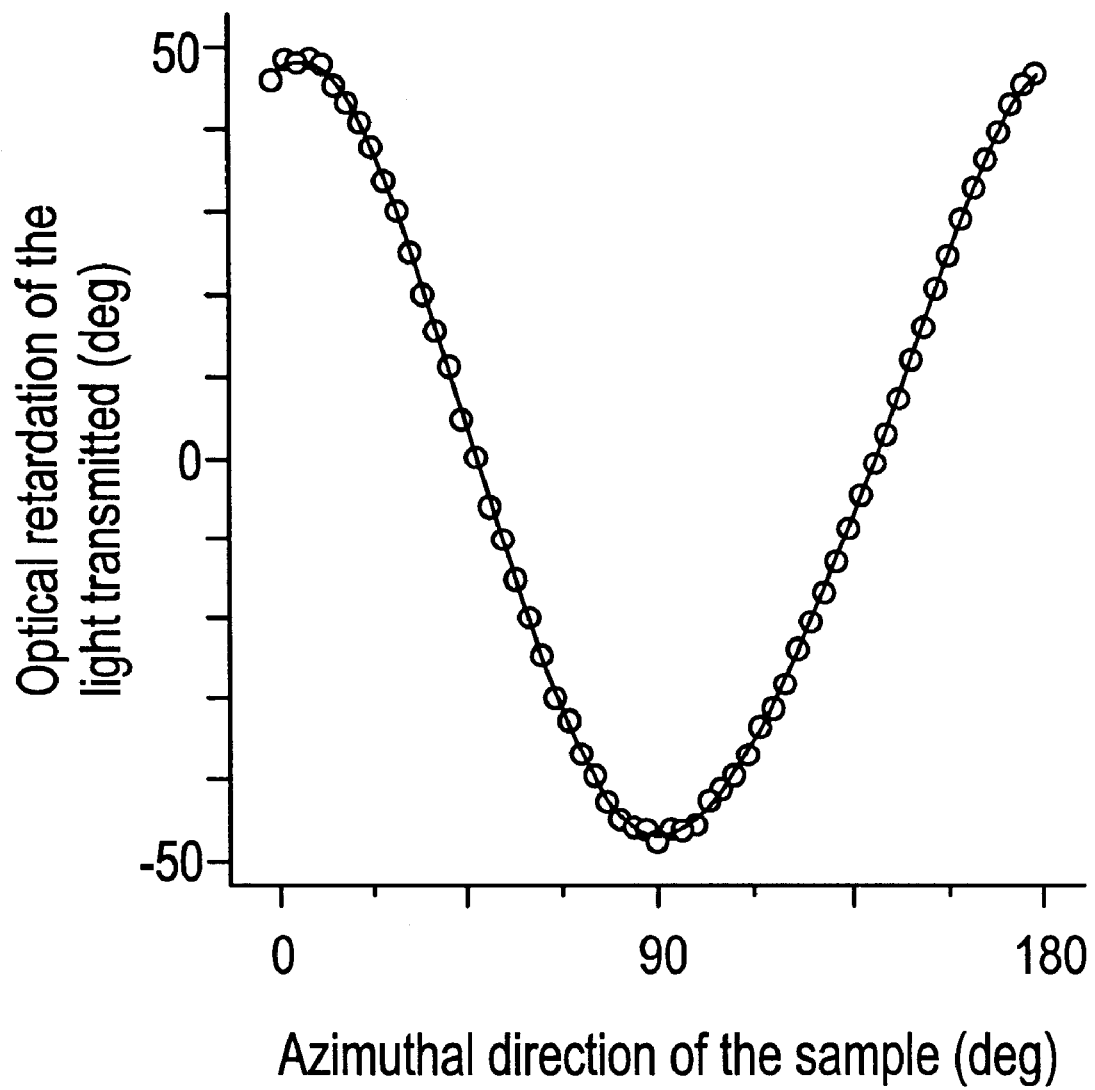
FIG. 2 is a graph showing the dependence of the optical retardation of the light transmitted through the liquid crystal sample on the azimuthal direction of the sample, which is measured by the measuring equipment of a liquid crystal angle of FIG. 1.
Figure 3:
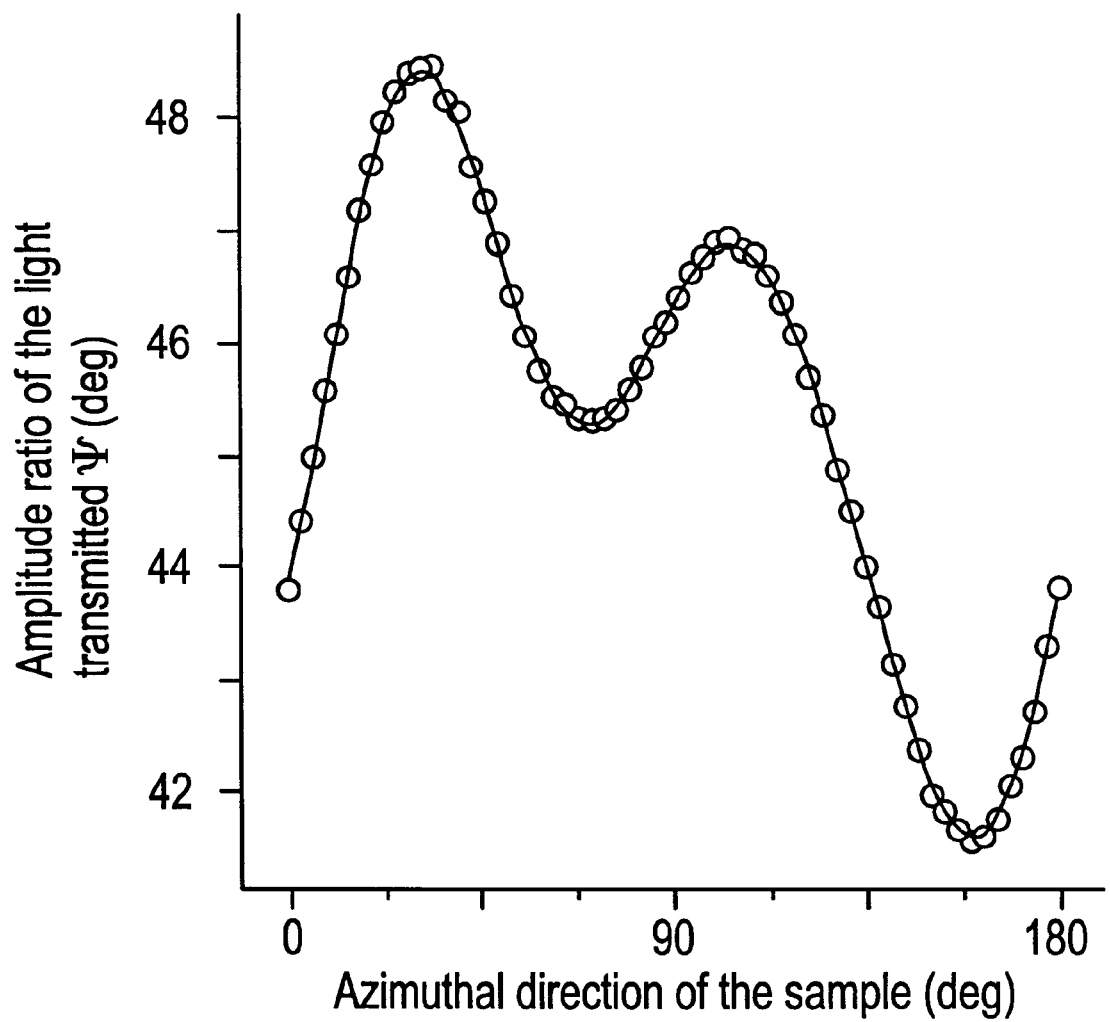
FIG. 3 is a graph showing the dependence of the amplitude ratio of the light transmitted through the liquid crystal sample on the azimuthal direction of the sample, which is measured by the measuring equipment of a liquid crystal angle of FIG. 1.

FIG. 2 and FIG. 3 show the dependencies of the optical retardation of the transmitted light and the amplitude ratio of the transmitted light on the azimuth of the sample, respectively, and each, with measured (○) and calculated (curve) results. The amplitude ratio therein is given in terms of arc tangent φ of the amplitude ratio as defined in numerous past literatures. Further, the azimuth of the sample is defined as 0 degree when the rubbing direction makes an angle of 45 degree with the vibration direction of the incident light. Further, calculated results were obtained through a data analysis unit 8. With refractive indices of the liquid crystal of 1.631 and 1.500, the polarization of the reflecting light was calculated. The calculated results fit the measured results most closely when a pretilt angle is 3.52 degree and the liquid crystal layer thickness is 4.2 μm. The solid lines in FIGS. 2 and 3 represent the polarization of the reflecting light, which were again calculated using these values. A pretilt angle of this sample was, thus, determined as 3.5 degree. Further, it is possible to determine the polarization of the transmitted light from the dependence of the output intensity on the azimuth of the analyzer by rotating the analyzer (the analyzer rotation method), instead of the phaser.

EXAMPLE 2

With the exception that the azimuthal direction of a sample is fixed and a polarizer 2 is rotated, the same arrangement of the measuring equipment (FIG. 9) as the first embodiment is used for the measurement of a liquid crystal sample in this embodiment. The polarization measurement of the transmitted light is carried out by the phaser rotation method as the first embodiment. However, the direction of polarization of the incident light varies in this embodiment so that, synchronizing with the polarizer, the direction of the analyzer is changed so as to correspond to the direction of the polarizer.

In the polarization measurement, sampling was performed every 3 degree of the azimuth of the phaser. Glass substrates 7059 from Corning Inc., with a thickness of 1.1 mm, were spin-coated with an alignment material PI-A produced by Nissan Chemical Industries Ltd. After baked at 250° C. for 1 hour, the surface was rubbed with the rayon cloth. A cell was then assembled by sticking a pair of glass substrates together with adhesive in such a way that the rubbing directions thereof were opposite to each other. In this, the adhesive mixed with a 20 μm spacer was utilized (Sample B). This cell was filled, through a capillary action, with the nematic liquid crystal produced by Merck Ltd., under the trade name of ZNI-2293.

Figure 4:
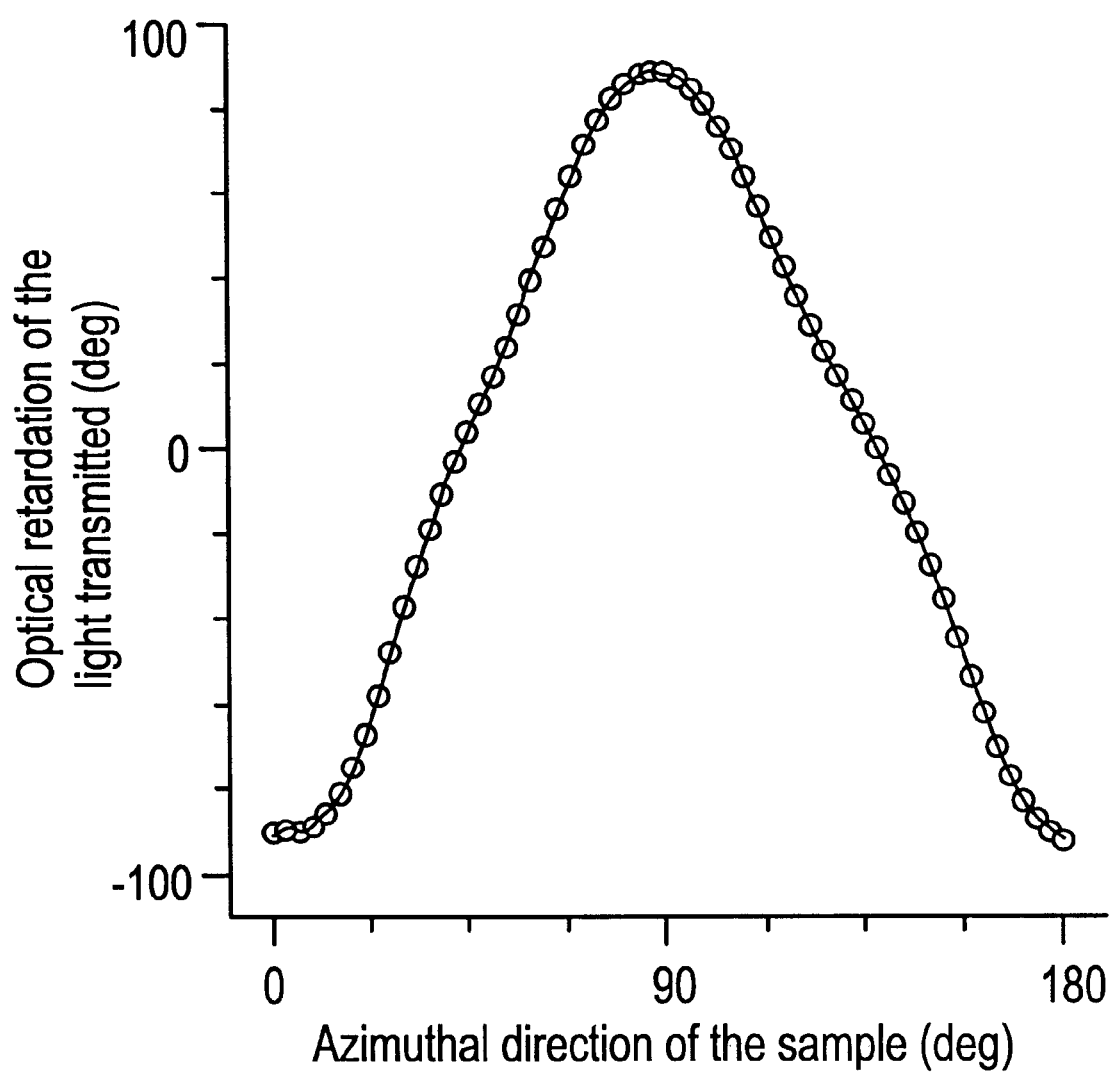
FIG. 4 is a graph showing the dependence of the optical retardation of the light transmitted through the liquid crystal sample on the azimuthal direction of the sample, which is measured by the measuring equipment of a liquid crystal angle of FIG. 9.
Figure 5:
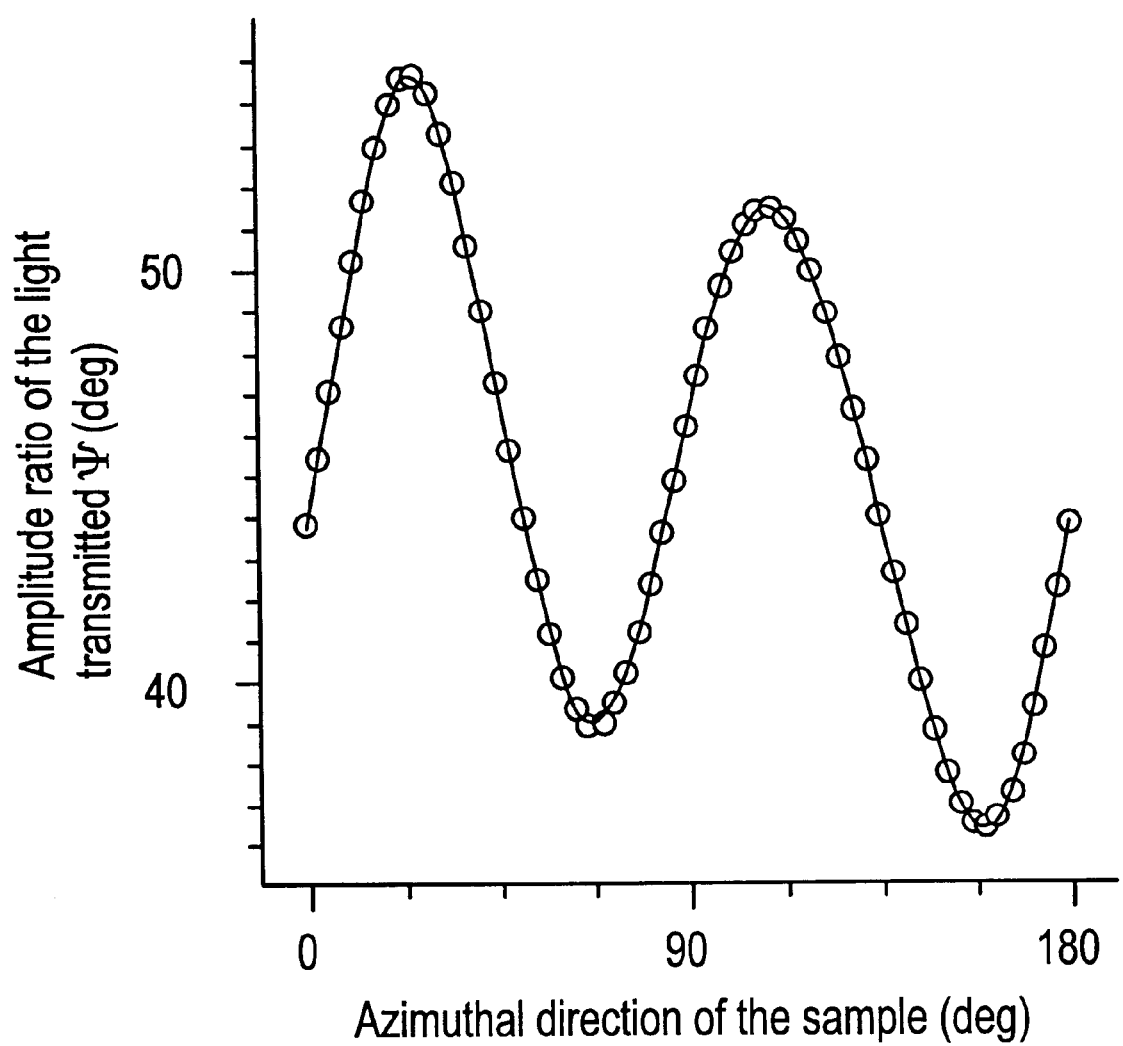
FIG. 5 is a graph showing the dependence of the amplitude ratio of the light transmitted through the liquid crystal sample on the azimuthal direction of the sample, which is measured by the measuring equipment of a liquid crystal angle of FIG. 9.

FIG. 4 and FIG. 5 show the dependencies of the optical retardation of the transmitted light and the amplitude ratio of the transmitted light on the azimuth of the sample, respectively, and each, with measured (○) and calculated (curve) results. The amplitude ratio therein is given in terms of arc tangent φ of the amplitude ratio as defined in numerous past literatures. Further, the azimuth of the sample is defined as 0 degree when the rubbing direction makes an angle of 45 degree with the vibration direction of the incident light. With refractive indices of the liquid crystal of 1.631 and 1.500, the polarization of the reflecting light was calculated. The calculated results fit the measured results most closely when a pretilt angle is 3.46 degree and the liquid crystal layer thickness is 20.5 μm. The solid lines in FIGS. 4 and 5 represent the polarization of the reflecting light, which were again calculated using these values. A pretilt angle of this sample was, thus, determined as 3.5 degree.

EXAMPLE 3

Figure 6:
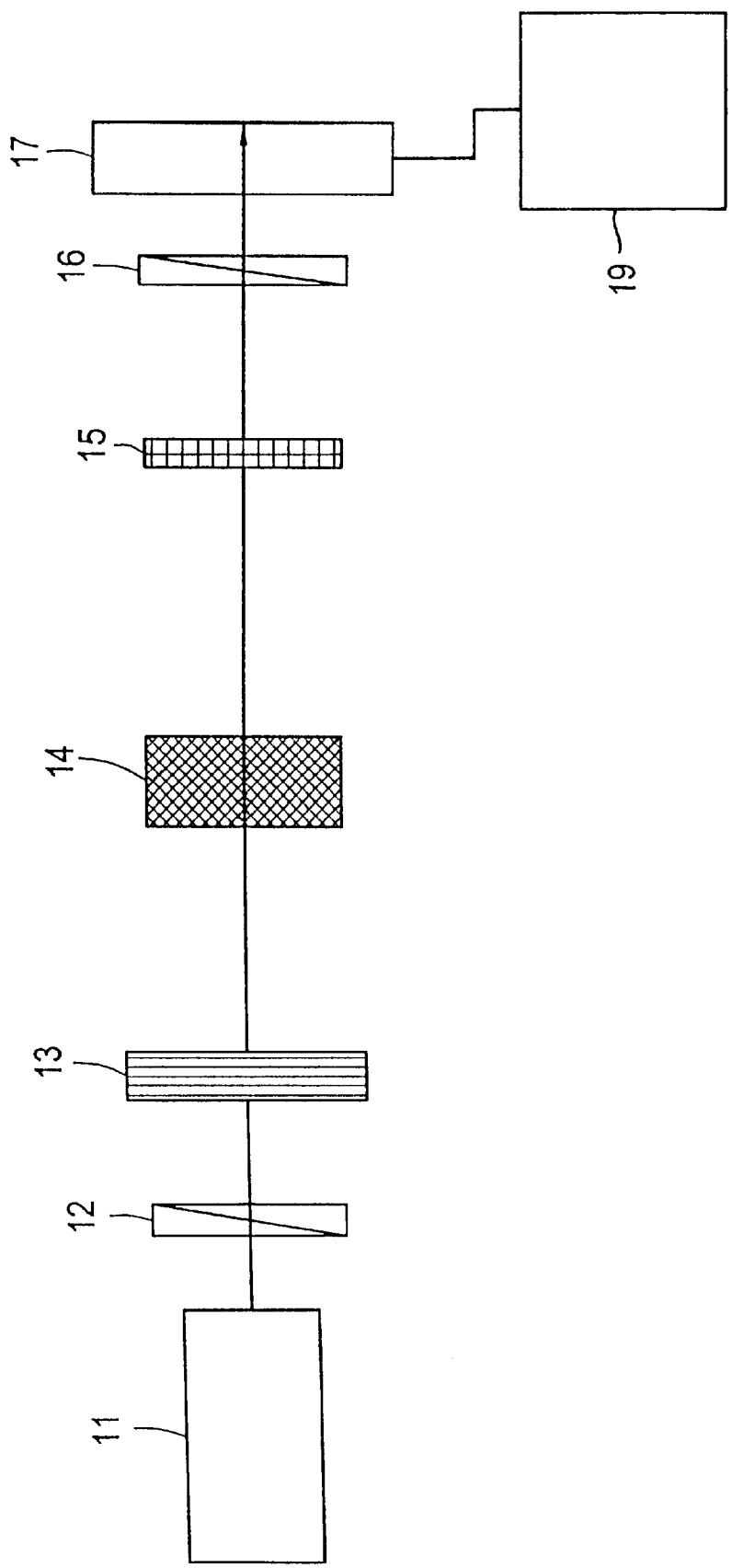
FIG. 6 is a schematic diagram illustrating another example of an equipment of measuring a liquid crystal pretilt angle in accordance with the present invention.

FIG. 6 is a schematic diagram illustrating an arrangement of an equipment of measuring a liquid crystal pretilt angle, wherein the linearly polarized light is normal to the surface of the liquid crystal sample in incidence and, by rotating said liquid crystal sample within plane, the dependencies of the amplitude ratio of said transmitted light as well as the optical retardation of said transmitted light on the azimuth of the liquid crystal sample with respect to the polarization direction of the incident light are measured, and thereby the pretilt angle of said liquid crystal sample is determined.

The light emitted from a light source 11 passes through a polarizer 12 and, being linearly polarized, goes into a ½-wave plate 13. As a light source, an 1 mW He-Ne laser is used. The incident light is normal to a sample 14 in incidence. The light transmitted through the sample passes through a ¼-wave plate 15 and an analyzer 16, and then goes into a detector 17. This detector monitors the polarization of the transmitted light and, from the obtained data, a liquid crystal pretilt angle is calculated by a data analysis unit 19. The orientation of the polarizer and that of the analyzer are set parallel.

The polarization of the transmitted light is determined by the phaser rotation method from the dependence of the output intensity on the azimuth of the ¼-wave plate 15. The polarization is measured by sampling the output intensity every 3 degree of azimuth of the phaser. Since the direction of polarization of the incident light is changed by a ½-wave plate, a component of the amplitude ratio of the transmitted light is determined with the rotation of polarization of the incident light taken into consideration. This was done in order to look into the changes in polarization which arise in the transmitted light by passing through the liquid crystal sample. Meanwhile, as in the second embodiment, it is possible to carry out the measurement by rotating the analyzer direction, synchronizing with the ½-wave plate orientation.

With this set-up, a liquid crystal sample was measured as follows. Glass substrates 7059 from Corning Inc., with a thickness of 1.1 mm, were spin-coated with an alignment material PI-A produced by Nissan Chemical Industries Ltd . After baked at 250° C. for 1 hour, the surface was rubbed with the rayon cloth. A cell was then assembled by sticking a pair of glass substrates together with adhesive in such a way that the rubbing directions thereof were opposite to each other. In this, the adhesive mixed with a 10 µm spacer was utilized (Sample C). This cell was filled, through a capillary action, with the nematic liquid crystal produced by Merck Ltd., under the trade name of ZNI-2293.

Figure 7:
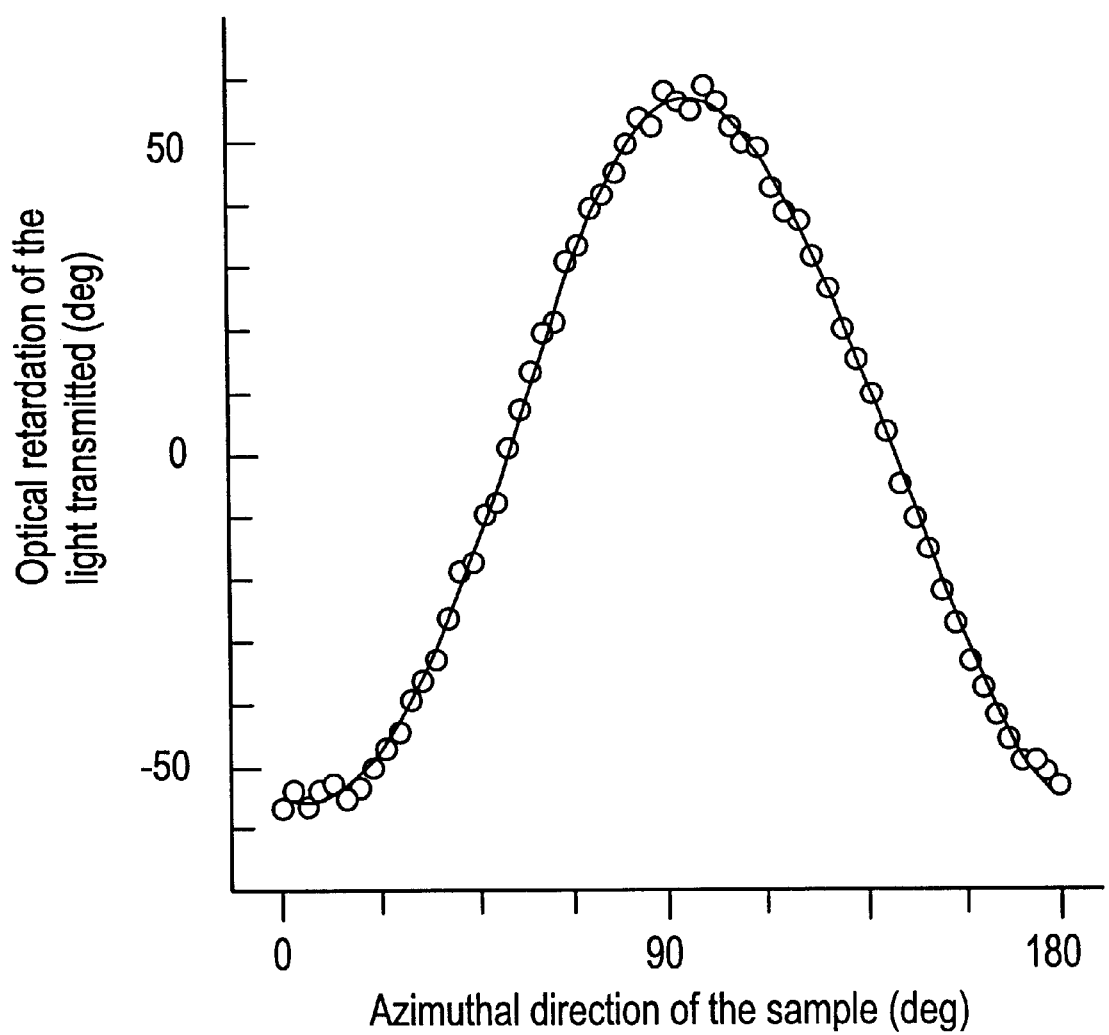
FIG. 7 is a graph showing the dependence of the optical retardation of the light transmitted through the liquid crystal sample on the azimuthal direction of the sample, which is measured by the measuring equipment of a liquid crystal angle of FIG. 6.
Figure 8:
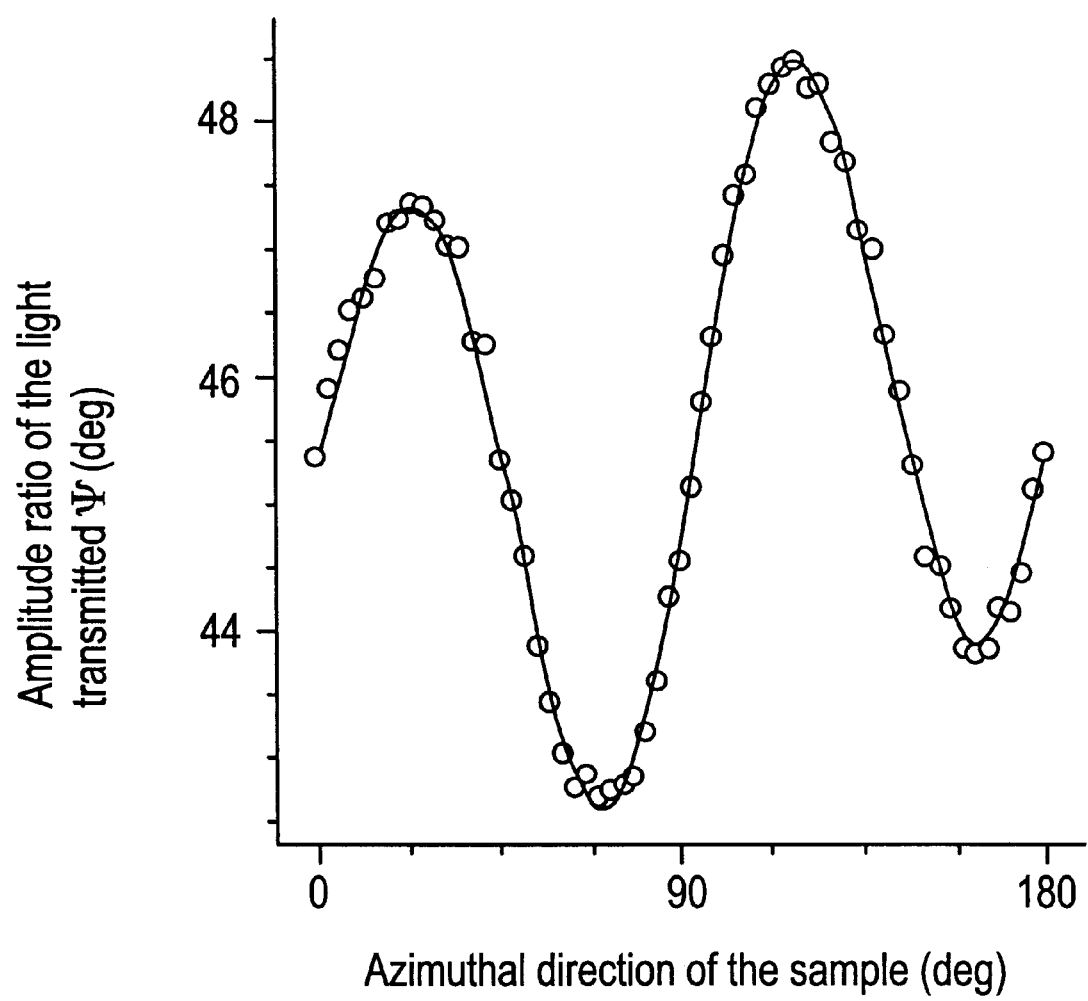
FIG. 8 is a graph showing the dependence of the amplitude ratio of the light transmitted through the liquid crystal sample on the azimuthal direction of the sample, which is measured by the measuring equipment of a liquid crystal angle of FIG. 6.

FIG. 7 and FIG. 8 show the dependencies of the optical retardation of the transmitted light and the amplitude ratio of the transmitted light on the azimuth of the sample, respectively, and each, with measured (○) and calculated (curve) results. The amplitude ratio therein is given in terms of arc tangent φ of the amplitude ratio as defined in numerous past literatures. Further, the azimuth of the sample is defined as 0 degree when the rubbing direction makes an angle of 45 degree with the vibration direction of the incident light. With refractive indices of the liquid crystal of 1.631 and 1.500, the polarization of the reflecting light was calculated. The calculated results fit the measured results most closely when a pretilt angle is 3.44 degree and the liquid crystal layer thickness is 10.3 µm. The solid lines in FIGS. 7 and 8 represent the polarization of the reflecting light, which were again calculated using these values. A pretilt angle of this sample was, thus, determined as 3.4 degree.

What is claimed is:

1. A method of measuring a liquid crystal pretilt angle which determines a liquid crystal pretilt angle by setting linearly polarized light incident on a liquid crystal sample and measuring the polarization of transmitted light thereof; wherein:

having passed through a polarizer, said linearly polarized light is normal to the surface of the liquid crystal sample in incidence; and by rotating said polarizer within plane, the dependencies of the amplitude ratio of said transmitted light as well as the optical retardation of said transmitted light on the azimuth of the liquid crystal sample with respect to the polarization direction of the incident light are measured and thereby the pretilt angle of said liquid crystal sample is determined.

2. A method of measuring a liquid crystal pretilt angle according to claim 1, wherein said dependencies of the amplitude ratio of said transmitted light as well as the optical retardation of said transmitted light on the azimuth of the liquid crystal sample with respect to the polarization of the incident light is measured, by rotating a ¼-wave plate placed behind said liquid crystal sample.

3. A method of measuring a liquid crystal pretilt angle according to claim 1, wherein said dependencies of the amplitude ratio of said transmitted light as well as the optical retardation of said transmitted light on the azimuth of the liquid crystal sample with respect to the polarization of the incident light is measured, by rotating an analyzer placed behind said liquid crystal sample.

4. An equipment for measuring a liquid crystal pretilt angle; comprising:

a light source;

a polarizer which polarizes emitted light from said light source;

a mechanism to rotate said polarizer within plane;

a holder which is placed behind said polarizer and holds a liquid crystal sample as an object of the measurement;

a means for measuring, with the light having passed through said liquid crystal sample, the amplitude ratio of said transmitted light as well as the optical retardation of said transmitted light; and a means for determining a liquid crystal pretilt angle from said measured polarization.

\* \* \* \* \*